May 14, 1940.　　　　R. B. BERNER　　　　2,200,589
PORTABLE ASPHALT MIXING PLANT CONSTRUCTION
Filed May 13, 1938　　　7 Sheets-Sheet 1
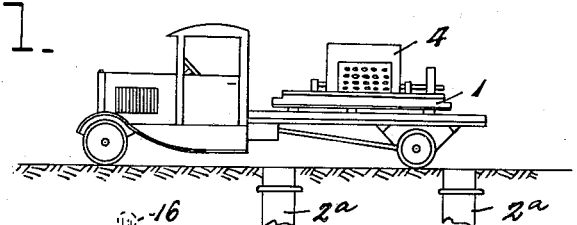
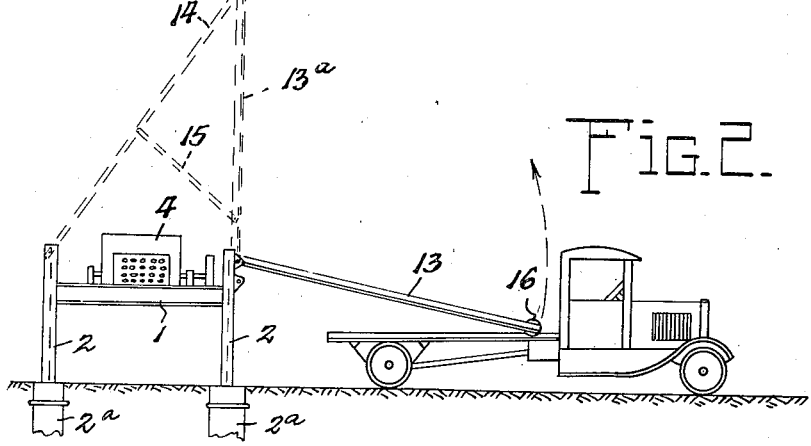
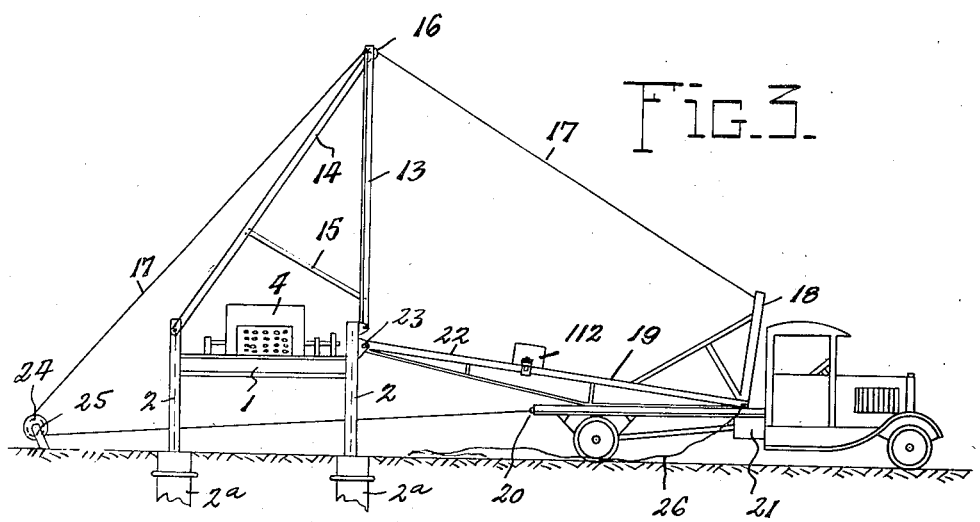
Inventor
ROBERT B. BERNER
By Robb & Robb
ATTORNEYS

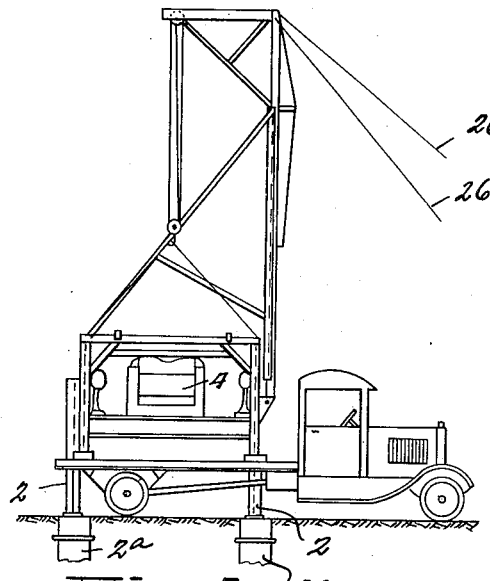
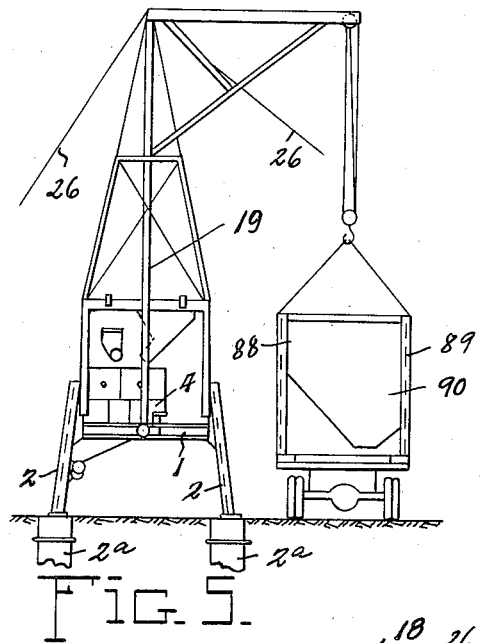
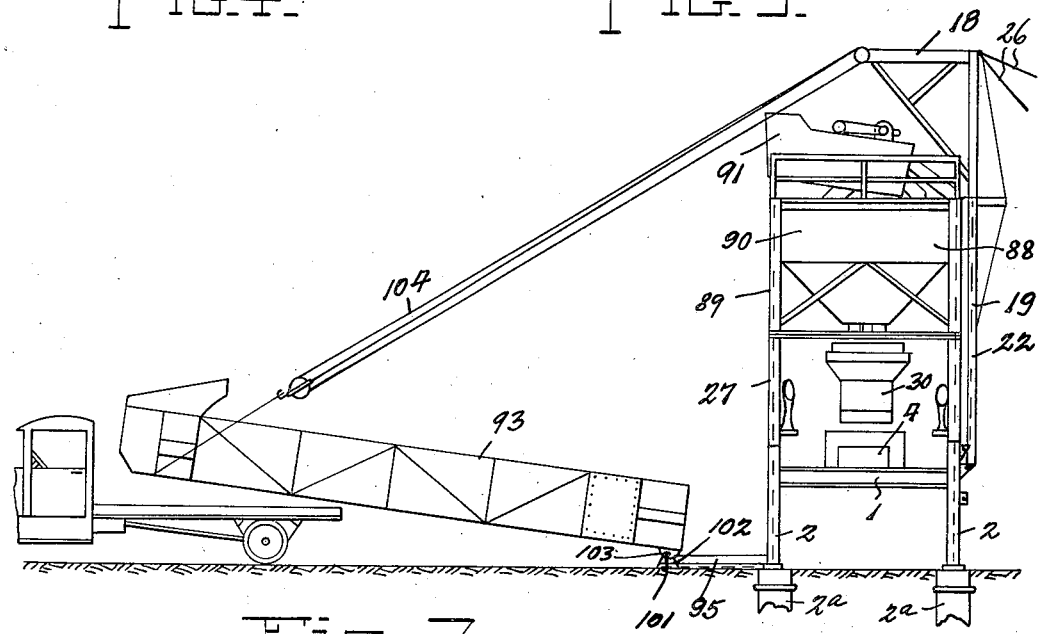

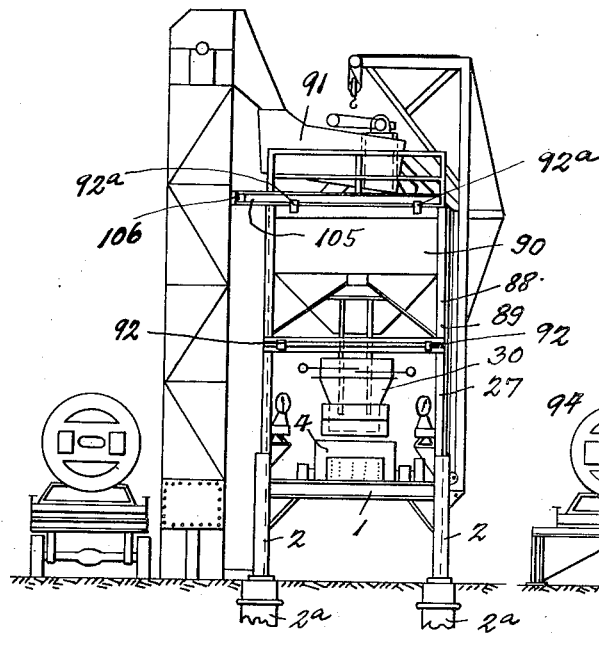
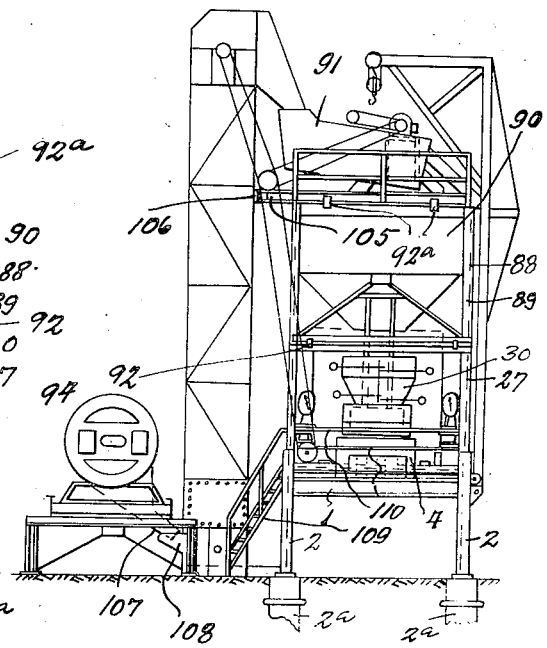
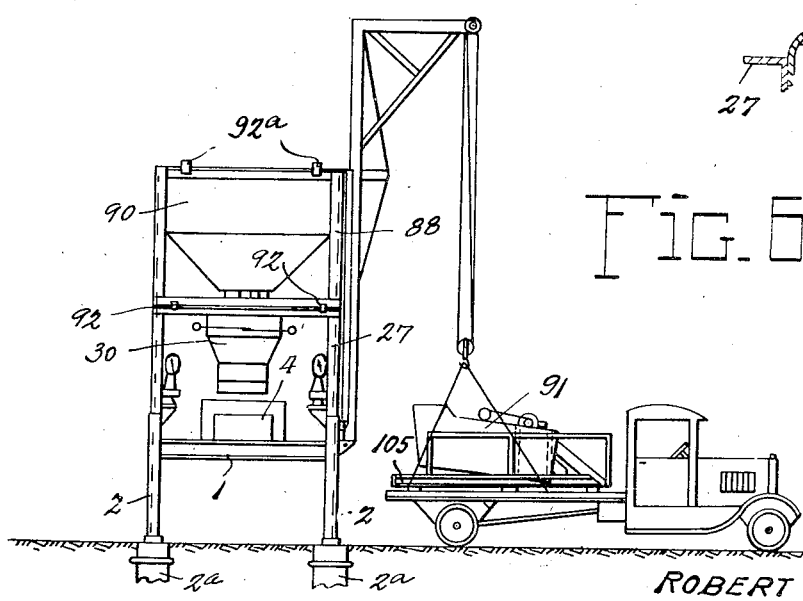

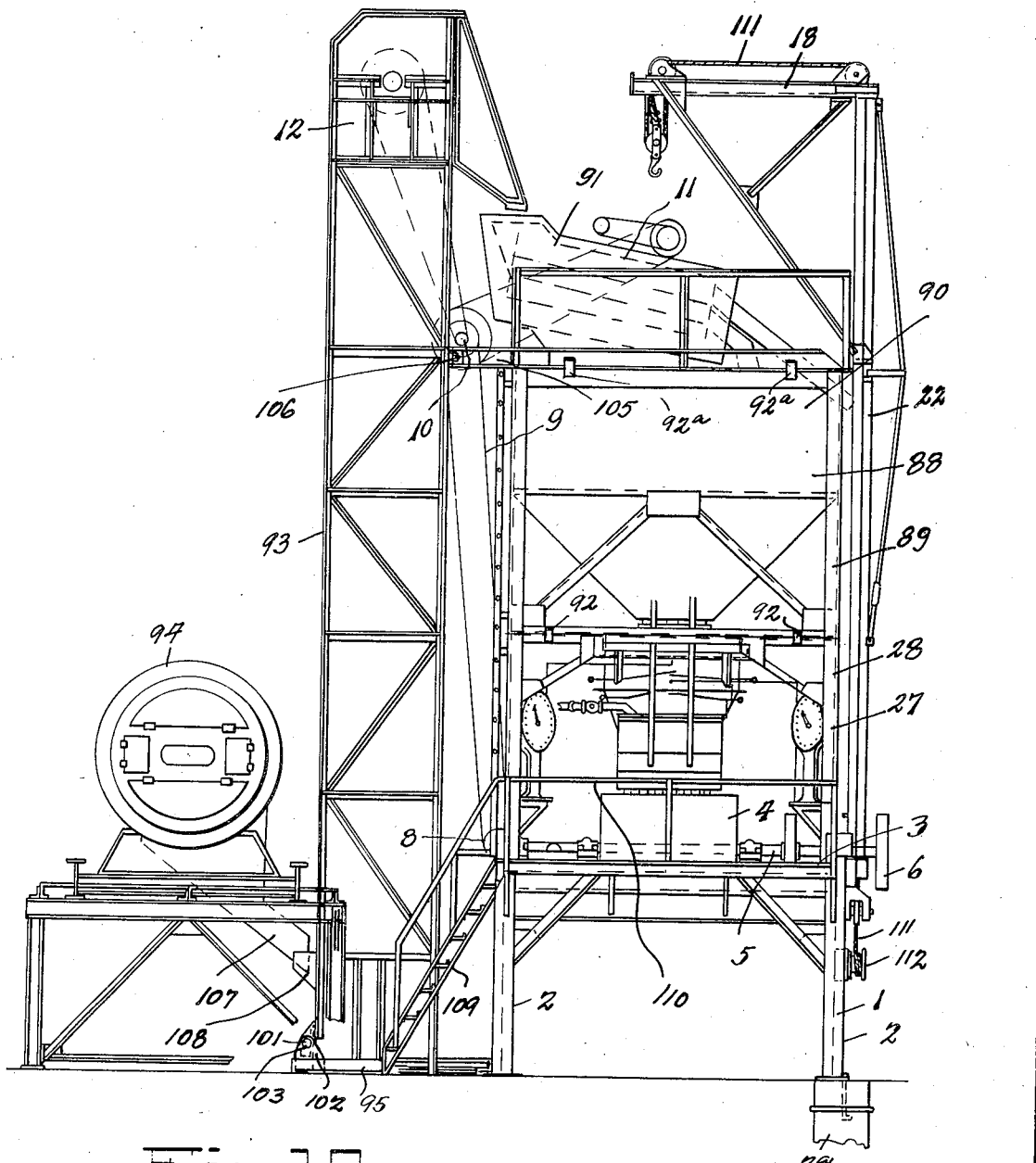

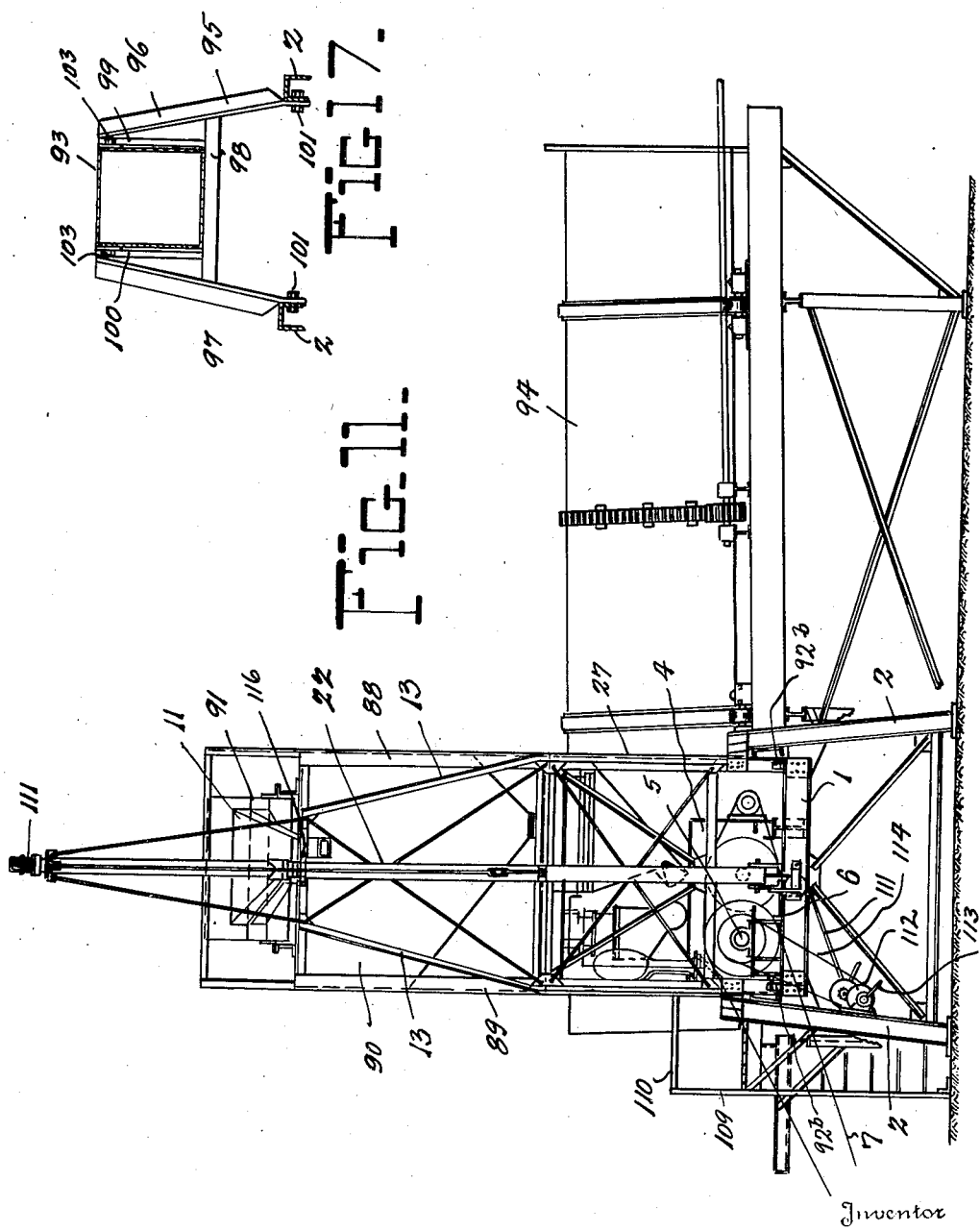

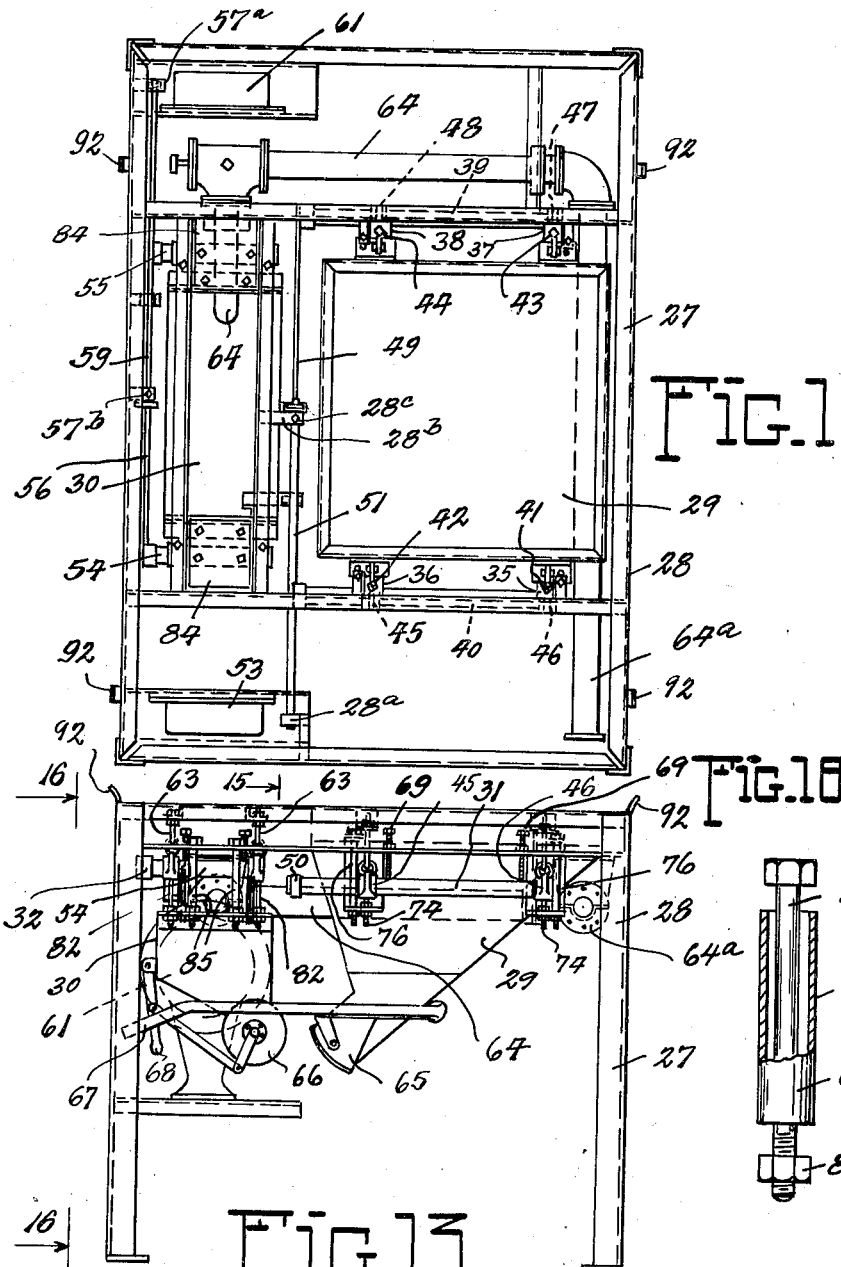

May 14, 1940.   R. B. BERNER   2,200,589
PORTABLE ASPHALT MIXING PLANT CONSTRUCTION
Filed May 13, 1938    7 Sheets-Sheet 7

Inventor
ROBERT B. BERNER

ATTORNEYS

Patented May 14, 1940

2,200,589

UNITED STATES PATENT OFFICE 2,200,589

PORTABLE ASPHALT MIXING PLANT CONSTRUCTION

Robert B. Berner, Indianapolis, Ind., assignor to Hetherington & Berner Inc., Indianapolis, Ind., a corporation Application May 13, 1938, Serial No. 207,831

3 Claims. (Cl. 259—153)

The present invention appertains to improvements in portable asphalt plants such as described in Letters Patent No. 2,112,326 to Robert Berner. Plants of this nature are primarily designed for mixing asphalt and other aggregates for road pavements and consist of various sections to be assembled on the site of use and to be knocked down and transported to another location upon completion of a certain project. The units or sections from which these plants are constructed are designed and built in such a manner as to permit their transportation on railroad cars, trucks, or the like without difficulty. However, even though the use of these units considerably expedites the assembly or knock-down of a plant of this nature, material delays, especially in the erection of such plants, are encountered, because various parts of the weighing instrumentalities which have to be disassembled and packed separately for transportation must be individually re-assembled, positioned, and calibrated during erection of the plant. These weighing instrumentalities comprise rather sensitive parts, such as the various blades which are somewhat brittle and apt to break or be damaged due to the jars and vibrations to which they are subjected during transportation. It will be obvious to those skilled in the art that the slightest damage to the scale mechanism will result in improper operation of the scales and render the same useless for further measuring and proportioning operations of the plant which usually have to be performed in accordance with strict specifications.

The assembly of the various weighing instrumentalities, especially the weigh beams, their connections to the weighing hoppers, and frame structure of the plant, is rather difficult in the field, and likewise the calibration of the scales at a location where no factory methods for calibrating the same are available often presents material problems.

Likewise, the necessary pipe lines of a portable asphalt mixing plant of the nature herein referred to have heretofore been disassembled from their respective units for purposes of transportation in view of the fact that the same were so closely positioned to the weighing beams and associated parts and the removal of the latter more or less necessitated the removal of these pipe lines to give access to the weighing structure.

It is therefore the primary object of the present invention to provide a portable plant structure of the character referred to herein which comprises a plurality of units completely assembled in respect to themselves, which are provided with arrangements to permit transportation from site to site and for preventing any damage to the vital parts of said units such as the weighing beams, their blades, and associated parts.

Another object of the present invention is to provide the various units with guide means to facilitate their proper and speedy assembly when one unit is lowered upon another in the erection of the plant.

A further object of the present invention resides in the provision of special anchoring means for securing the elevator to the base structure of the plant and for providing an efficient pivot means for facilitating the erection of the elevator and its location in regard to the other parts of the construction.

Other and further objects will become apparent from the following description and accompanying drawings, in which—

Figure 1 illustrates the base unit of the plant in knock-down condition mounted upon a truck for transportation.

Figure 2 shows the positioning of the base unit as the primary step of erection of the plant and also illustrates the assembly and erection of the A-frame structure.

Figure 3 discloses the parts referred to above in proper assembled condition and shows the manner in which the hoist of the plant is connected to the base unit and raised to its proper position by the use of certain hoisting instrumentalities, and the vehicle upon which the hoist is transported to the site.

Figure 4 discloses the next step in the erection of the plant which comprises the hoisting and positioning of the weighing and aggregate proportioning unit upon the base structure.

Figure 5 shows the mode in which the bin unit is hoisted to position to assemble the same upon the aggregate weighing and proportioning unit.

Figure 6 illustrates the utilization of the hoisting instrumentalities of the plant for positioning the screen unit upon the bin unit which constitutes the next step in the assembly of the asphalt mixing plant structure.

Figure 7 is a diagrammatic view illustrating the positioning and erection of the elevator.

Figure 8 shows the parts referred to in Figures 1 to 7 in assembled position, together with the drying unit arranged adjacent the elevator and ready for cooperative interconnection with the same.

Figure 9 shows a further step in the assembly of the plant, the arrangement of the discharge chute for the dryer and the charging chute of the elevator.

Figure 10 is an enlarged side view of the assembled asphalt mixing plant.

Figure 11 is an end view of the completely erected plant structure.

Figure 12 is a plan view of the weighing and aggregate proportioning unit.

Figure 13 is a front view of the same.

Figure 14 is a detail view of the locking instrumentalities for the weighing beams as employed in connection with the aggregate weighing batcher and likewise the weighing beams of the asphalt weighing and proportioning device.

Figure 15:
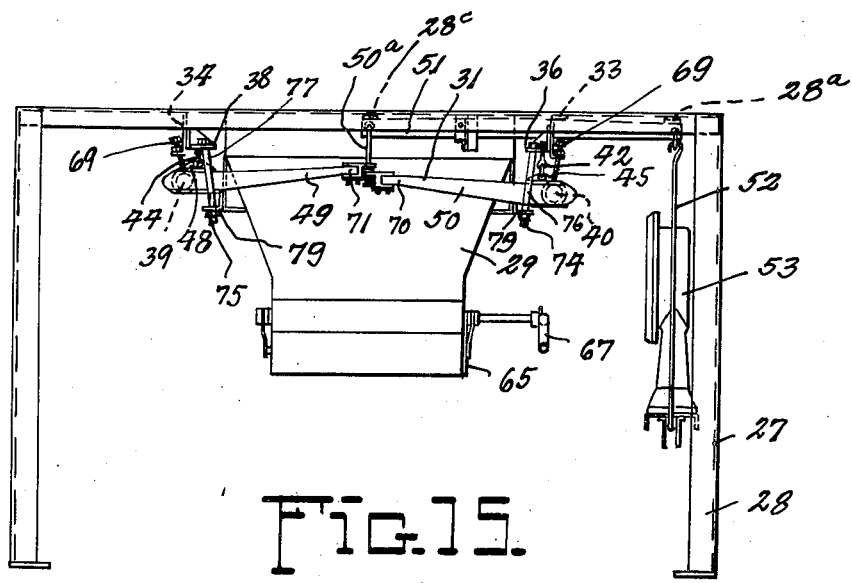

Figure 15 is a side view of the aggregate weighing and proportioning unit, the view being taken in the direction of arrows 15—15 of Figure 13, certain parts being omitted for purposes of clarity.

Figure 16:
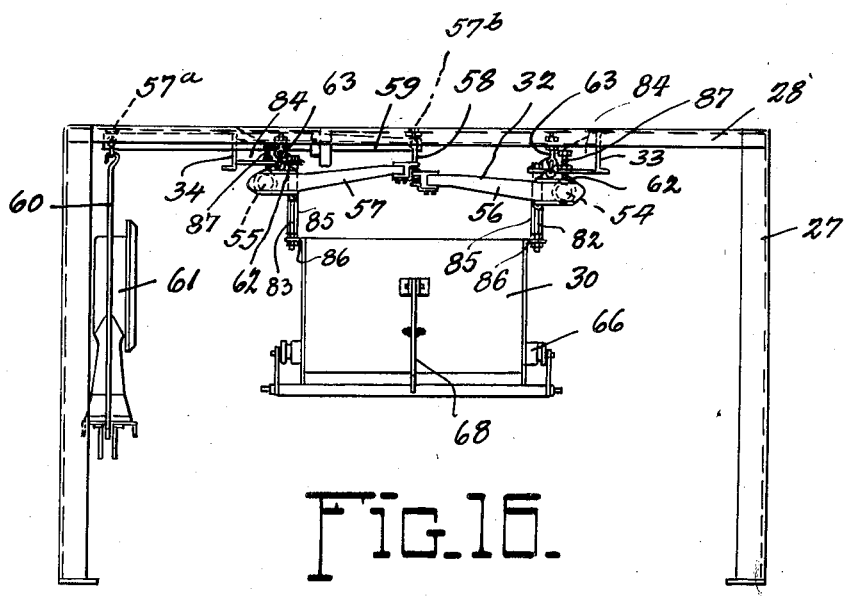

Figure 16 is a view similar to Figure 15, but showing only the weighing and proportioning mechanism for the asphalt weighing and proportioning devices.

Figure 17 is a diagrammatic view of the anchoring means for the elevator.

Figure 18 is a detail view of the spacing members employed in connection with the present invention.

Figure 19 is a detail view of the guide member.

Referring now to the drawings, and especially to Figure 10, 1 generally indicates the base unit of the plant which comprises a plurality of uprights 2, and a platform 3 upon which the mixer 4 is mounted, which may be of any conventional structure and includes agitating means, not shown, mounted upon a shaft 5 provided with a pulley 6. The pulley 6 is preferably driven by a portable engine positioned adjacent the plant structure over belt 7. The shaft 5 is furthermore operatively interconnected by any desirable means to a sprocket 8, which, in conjunction with a chain 9, is adapted to actuate shaft 10 operatively connected by chain and sprocket drive mechanism with the operating parts of screen 11 and elevator 12.

Referring now to Figure 1, with particular reference to the erection of the plant, the base unit 1 is transported to the desired location, and, while the same is still positioned upon the platform of a vehicle as shown in Figure 1, the uprights 2 are attached to the same so that when the vehicle is removed the unit 1 will be properly positioned as shown in Figure 2, preferably upon foundations 2a which have been prepared previous to the erection of the plant.

An A-frame 13, see Figures 2 and 11, is now connected to opposing uprights 2 and elevated to a position as shown at 13a in Figure 2. Temporary truss members 14 and 15, see Figures 2 and 3, are attached to the A-frame 13 in the manner shown, to maintain the latter securely in its proper position. The A-frame 13 is provided at its upper end with a sheave 16 over which a cable 17 is trained previous to erection of the A-frame. One end of this cable is attached to the end 18 of the horizontal portion of the hoist 19 while the other end of the cable, as shown at 20, is connected to a vehicle 21 used for transporting the hoist 19 to the location of the plant. After the lower end of the hoist boom 22 has been pivotally connected to adjacent upright members 2 as shown at 23, forward movement of the vehicle 21 will exert a pull upon the cable 17 and the hoist 19 will be moved upwardly to its erected position as shown in Figure 4. It will be noted that the cable 17 is trained around an auxiliary pulley 24 maintained in proper position by a stake member 25 driven into the ground as will be seen from Figure 3. Guy and guide wires are attached to the upper portion of the hoist 19 and are indicated at 26. These wires may be held from the ground during erection of the hoist to prevent swaying of the same and to prevent tipping of the plant structure during subsequent hoisting operations. When the plant is finally erected, these guy wires may be removed.

Referring again to Figure 10, which illustrates the complete structure of the plant, it will be noted that positioned upon the base unit 1 is a weighing and proportioning unit generally indicated at 27. This unit comprises the frame structure 28, more clearly shown in Figures 15 and 16, and carries the aggregate weighing hopper 29, the asphalt weighing hopper 30, and the scale mechanisms 31 and 32 associated with these weighing hoppers.

Referring now more specifically to this unit, it will be seen that the same comprises a plurality of U-channels 33 and 34 which are secured to the frame structure 28. These U-channels are provided with brackets 35, 36, 37, and 38 adapted to support the scale shafts 39 and 40 by means of hangers 41 and 42, 43 and 44. These hangers fasten to brackets 45, 46, 47, and 48 secured to the scale shafts 39 and 40 which may be clearly seen from Figure 15. Secured to the scale shafts 39 and 40 are the scale beams 49 and 50, in turn operatively connected by means of a hanger 50a, scale beam 51, and rod 52 to the scale dial mechanism 53. The hanger member 50a is of a yokelike configuration and comprises the vertical members 50b and 50c cooperating with blades 49a and 50d of the scale beams 49 and 50 so that when aggregates are placed within the weighing hopper 29 the scale beams 49 and 50 will move downwardly more or less, according to the weight of the material contained in the hopper, and will transfer such movement to the beam 51, the rod 52, and the scale dial mechanism 53 which will indicate the proper weight contained in the hopper. Hangers 74 and 75 are connected to the brackets 45, 46, 47, 48 and bracket 79 on the hopper 29 for suspending the same on the scale mechanism.

Likewise, the weighing hopper 30 for the asphalt comprises a plurality of scale shafts 54 and 55 provided with scale beams 56 and 57 cooperating with a yoke 58, scale beam 59, rod 60, and scale dial mechanism 61 in a manner similar to that above referred to in regard to the weighing hopper 29. The scale shafts 54 and 55 are provided with brackets 62 for supporting the same on the frame structure 28 by means of hangers 63.

The unit 27 is further provided with a supply pipe line 64, which leads to the asphalt mixer, and the free end 64a of which may be connected to an asphalt pump and the source of supply for the asphalt in any convenient manner. The hoppers 29 and 30 are provided with gates or valves 65 and 66 which may be operated by control handles 67 and 68 in any conventional manner to discharge the weighed and proportioned aggregates and asphalt from the hoppers to the mixer 4 of the base unit 1, wherein the same are properly mixed and thereafter discharged therefrom and transported to the place of use.

Heretofore it has been the practice to entirely disassemble all parts of the scale mechanisms of the aggregate weighing and proportioning unit 27 when the plant is knocked down, and this procedure has been found rather times-taking, especially in re-assembling the plant at its new location; the parts of the scale mechanisms have to be properly positioned again on the frame structure 28 and numerous operations are necessary to properly re-locate these parts and to calibrate the scale mechanism to obtain proper functioning of the same. The methods available in the field for carrying out such procedure are rather cumbersome, and in view of the condensed construction of the weighing and proportioning unit it is somewhat difficult to install these parts. The weighing and proportioning unit of the present invention has therefore been designed and provided with certain arrangements now to be described, which enable arresting and locking of the scale mechanisms in such a manner that the unit may be transported without disassembling these instrumentalities. To this end the frame 28 is provided with a stop 28a and a bracket 28b and set screw 28c, so that when the set screw 28c is tightened against one end of beam 51, the other end of this beam is forced against stop 28a and the beam 51 is therefore properly held in this position against movement. Likewise, a plurality of screws 69 have been provided on the U-channels 33 and 34 which are tightened against the scale shafts 39 and 40 to force the same downwardly and to cause upward movement of the free ends 70 and 71 of the scale beams 50 and 49 to thereby unseat the blades 50d and 49a from their cooperative yoke portions 50c and 50b. The ends of the scale beams 70 and 71 are further provided with brackets 72 and 73 which will engage the lower surface of the yoke portions 50c and 50b to thereby hold the yoke member 50a properly arrested in its inoperative position and to eliminate any movement of the latter during shipment of the unit. The hopper 29 which is normally suspended from the scale beams 49 and 50 by means of hangers 74 and 75 is raised upwardly by means of supporting and spacing members 76 and 77. These spacing members are arranged between brackets 35 to 38 on the frame structure 28 and brackets 79 on the hopper structure 29. These spacing members 76 comprise a bolt member 80 and a spacing sleeve 81, as clearly seen from Figure 18. With the spacing members 81 positioned between the brackets 35 to 38, and 79, the nuts 80a of the bolts 80 may be tightened and the hopper 29 will be raised a certain distance and will be properly held in a desired and predetermined relationship with respect to the scale mechanism, depending upon the length of the spacer members 81.

With the hopper 29 and the scale mechanism arrested in positions as shown in Figure 15, it will be noted that the entire weight of the hopper is now carried by the members 76 and 77 and the load of the hopper is taken off the scale mechanism. The scale mechanism itself, and particularly the scale shafts 39, 40, beams 49, 50, yoke 50a, and beam 51, are properly arrested and interlocked with regard to each other so that no movement between the respective parts is possible. The blades 49a and 50d are lifted off the yoke members 50b and 50c so that no damage to these blade members during shipment is possible. In this way the vital parts of the weighing mechanism of the hopper 29 are conditioned for shipment in a very efficient and simple manner, and after the plant has been assembled at a new location all that is necessary is to unlock the lock screws 69 and loosen the hopper supporting and locking members 76 and 77 sufficiently to permit a free upward and downward movement of the hopper 29 within the indicating limits of the scale for weighing operations. Of course, if desired the members 76 and 77 may be entirely removed; however, this is not necessary.

In a similar manner, the asphalt weighing hopper which is normally suspended from the scale beams 56 and 57 by means of hangers 82 and 83 may be raised and moved upwardly so that its weight is taken off its cooperating scale mechanism. For this purpose the U-channels 33 and 34 are provided with brackets 84, to which locking and spacing members 85 are secured and which engage the brackets 86 of the hopper 30. These supporting and arresting members 85 are of the same construction as those shown in Figures 15 and 18, although their length may vary according to conditions. The brackets 84 are further provided with locking screws 87 which are adapted to engage the scale shafts 54 and 55 to lock the same with their cooperating scale beams 56 and 57 while a stop 57a and bracket and lock screw 57b are utilized to lock beam 59 in the same manner as referred to above in regard to scale mechanism shown in Figure 15.

The free ends of the scale beams 56 and 57 and the hanger or yoke 58 are of the same construction as shown in Figure 14.

It will therefore be seen that with the supporting and arresting members 85 and the clamping screws 87 and 57b positioned as shown in Figure 16, the hopper 30 and its associated scale mechanism are in proper locked and arrested position for shipment. To render these instrumentalities again operative when the plant is erected at its new location, these locking and supporting parts have only to be loosened, or, if desired, removed, in a manner like that referred to in regard to Figure 15. It will therefore be seen that the weighing and proportioning unit may be readily conditioned for shipment in a very simple and efficient manner, and that the times-taking operations previously necessary have been entirely eliminated. The parts of the mechanism remain properly located and their calibrations are not disturbed.

When the weighing and proportioning unit arrives at its new location, as shown in Figure 4, all that is necessary is to hoist and position the same upon the base unit 1. Thereupon these two units may be bolted together in any convenient manner to obtain a completely rigid structure.

From Figure 10 it will be noted that the bin unit 88 comprises a frame structure 89 and an aggregate bin or bins 90. These parts are assembled to a rigid unitary structure and can be readily placed upon the weighing and proportioning unit in the next step of the erection of the plant, as shown in Figure 5, whereupon the screen unit 91, as shown in Figure 10, is hoisted and positioned upon the bin unit in the manner illustrated in Figure 6.

The weighing and proportioning unit 27 may be provided with guide members 92 to facilitate the assembly of the bin unit in said proportioning unit. These guide members 92, a detail of which is shown in Figure 19, facilitate the proper assembly of the units very considerably, as will be obvious to those skilled in the art.

The next step in the erection of the asphalt mixing plant involves the erection and positioning of the elevator 93. This elevator, as will be seen from Figure 10, is adapted to elevate materials received from the dryer 94 and to transfer the same to the screen 91 from where the proper sized aggregates are discharged into the storage bin or bins 90.

Certain of the uprights 2 are provided with a frame structure 95, which, when the base unit 1 is erected, lies directly on the ground surface, as clearly shown in Figure 7. This frame structure comprises a plurality of angle irons 96 and 97, reinforcing member 98, and the elevator supporting members 99 and 100 which are secured to the channels 96, 97, and the reinforcing member 98 in any convenient manner such as by welding or the like. This entire structure constitutes an anchorage unit for the elevator and may be removably or permanently attached to the uprights 2, as shown at 101. The outer ends of the members 99 and 100 are provided with pivot and bearing portions 102 to which the lower end of the elevator 93 is hinged by means of bolts 103 after the elevator has been transported to the location of the plant and brought into position as shown in Figure 7. The cables 104 of the hoist 19 are now attached to the elevator as shown in this latter figure, and the same is raised to its upright position as shown in Figure 8, whereupon the elevator is connected to the extension 105 of the screen unit by bolting the same thereto as clearly shown at 106. In this way the elevator is held at proper spaced position with respect to the remaining plant structure. The provision of the pivot and anchoring means 95 of the elevator affords very efficient means for erecting and positioning the elevator and simplifies very considerably the assembly of the same, as will be obvious to those skilled in the art.

After erection and positioning of the elevator the dryer 94 is positioned adjacent the same, as seen in Figure 8, and after the discharge chute 107 of the dryer and charging chute 108 of the elevator have been assembled in the manner illustrated in Figure 9, all that remains to be done for completing the erection of the plant is to provide the same with the stair structure 109 and railing 110.

The hoist boom 22 may be preferably of tubular construction so that the downwardly extending hoist cable 111, see Figure 11, may be positioned interiorly of the boom. The hoist cables may be manually operated by hoist mechanism 112, as clearly shown in Figure 11. This hoist mechanism may be supplied in a unit and mounted during the transportation of the plant upon the hoist boom 22 at a position clearly shown in Figure 3. Previous to the erection of the hoist, the hoist unit is connected to the base unit 1 at a position as seen in Figure 11. The hoisting mechanism may be manually operated by using crank handle 113 or may be driven by a pulley and belt arrangement as shown at 114 upon rotation of shaft 5, the latter being in turn operated by a power engine, as already referred to hereinbefore. The provision of a manually operable hoist makes it possible to carry out the various hoisting operations in the erection of the plant even though the power engine has not yet arrived at the site or the respective belt connections for the same have not yet been accomplished.

The bin unit 88 may be also provided with guides 92a at its upper portion to facilitate the assembly of the screen unit with said bin unit in a like manner to that referred to previously in regard to the assembly of the bin unit and the weighing and proportioning unit.

When the A-frame and hoist are in their erected position, the hoist may be fastened to the A-frame by means of a bracket 116 as will be clearly seen from Figure 11. In this way the hoist structure is considerably reinforced by the A-frame, which in turn is connected to the bin unit and weighing and proportioning unit so as to give the entire structure considerable rigidity.

When the hoist has been raised in position and guyed, the brace members 14 and 15 may be removed; the same were only installed for temporarily bracing the A-frame 13 to hold the same in secured position during the erection of the hoist boom 19, as clearly shown in Figure 3.

It is further noted that while the brackets 72 and 73 at the free ends of the scale beams are adapted to hold the yoke member 50a against movement, they function at the same time to properly arrest the free ends of the weighing beams against upward movement.

During transportation of the hoist unit 19 the hoist mechanism 112 may be secured to the same in a position as shown in Figure 3.

The base unit 1, see Figure 11, is provided with guide member 92b to assist the assembly of the same with the aggregate weighing and proportioning unit. These guide members are of the same structure as those disclosed at 92 and 92a.

Having thus described my invention, what I claim as new and desire to secure by Letters Patent of the United States, is—

1. In a portable type aggregate mixing plant, a base unit comprising a platform having a mixer unit mounted thereon, a plurality of aggregate handling units adapted to be supported on said platform, hoist means for lifting said handling units into assembled position over said platform connected to one side of said platform and movable from knockdown to a vertical position, means rigidly securing said hoist means in vertical position with respect to said platform, an elevator connected to the other side of said platform and movable by said hoist means from a knockdown to a vertical position adjacent said handling units, and means for fixedly connecting said elevator, hoist means, and handling units together to provide a rigid structure including said platform.

2. In a portable type aggregate mixing plant, a base unit comprising a platform having a mixer unit mounted thereon, a plurality of aggregate handling units adapted to be supported on said platform, hoist means for lifting said handling units into assembled position over said platform connected to one side of said platform and movable from knockdown to a vertical position, means rigidly securing said hoist means in vertical position with respect to said platform, an anchoring and supporting platform rigidly connected to said first named platform, an elevator pivotally connected to said anchoring platform at the outer edge thereof and movable by said hoist means from a knockdown to a vertical position supported by said platform, and means for fixedly connecting said elevator, hoist means, and handling units together to provide a rigid structure including said platform.

3. In a portable type aggregate mixing plant, a base unit comprising a platform having a mixer unit mounted thereon, a plurality of aggregate handling units adapted to be supported on said platform, an A-frame connected to said platform and movable from a knockdown to a vertical position, hoist means for lifting said handling units into assembled position over said platform connected to one side of said platform and movable from knockdown to a vertical position against said A-frame, said A-frame being provided with hoisting mechanism for assisting in moving said hoist means, an elevator connected to the side of said platform opposite said hoist means and movable by said hoist means from a knockdown to a vertical position adjacent said handling units, and means for fixedly connecting said elevator, hoist means, A-frame, and handling units together to provide a rigid structure including said platform.

ROBERT B. BERNER.